(12) United States Patent
Tagawa et al.

(10) Patent No.: US 8,538,041 B2
(45) Date of Patent: Sep. 17, 2013

(54) AUDIO-VIDEO REPRODUCTION APPARATUS

(75) Inventors: Hironori Tagawa, Bandar Baru Bangi (MY); Chee Hun Tang, Bandar Baru Bangi (MY)

(73) Assignee: Sony EMCS (Malaysia) Sdn. Bhd. (MY)

( * ) Notice: Subject to any disclaimer, the term of this patent is extended or adjusted under 35 U.S.C. 154(b) by 1098 days.

(21) Appl. No.: 12/228,833

(22) Filed: Aug. 15, 2008

(65) Prior Publication Data

US 2009/0048697 A1  Feb. 19, 2009

(30) Foreign Application Priority Data

Aug. 16, 2007  (MY) ............................... PI 20071365

(51) Int. Cl.
  *G06F 17/00*  (2006.01)
(52) U.S. Cl.
  USPC ........................................... 381/102; 700/94
(58) Field of Classification Search
  USPC ................................................... 381/28, 58
  See application file for complete search history.

(56) References Cited

U.S. PATENT DOCUMENTS

| 5,896,457 A | * | 4/1999 | Tyrrel | 381/56 |
| 6,167,139 A | | 12/2000 | Kim | |
| 6,411,289 B1 | * | 6/2002 | Zimmerman | 715/243 |
| 2002/0126121 A1 | * | 9/2002 | Robbins | 345/440 |

* cited by examiner

*Primary Examiner* — David Vu
*Assistant Examiner* — Jonathan Han
(74) *Attorney, Agent, or Firm* — Lerner, David, Littenberg, Krumholz & Mentlik, LLP

(57) ABSTRACT

An audio-video (AV) reproduction apparatus capable of analyzing the spectrum of the audio component of an input or reproduced AV signal. The audio component is fed into an unused electronic graphic equalizer (106), the audio frequency bands corresponding to the frequency bands of the electronic graphic equalizer (106) are sampled one frequency band at a time, to obtain the peak level input of each frequency band. The collected peak level input for each frequency band is used to render graphics in the form of equal number segmented spiking bars, where the length of each segmented bar is rendered according to the peak level input of each frequency band. While the rendering is ongoing, another set of peak level input is collected to render the next set of segmented bars. The continuous process of collecting the peak level input and rendering the segmented bars creates a dynamic spectrum analyzer. The spectrum display is superimposed as a graphic over the video signal being reproduced by the apparatus.

13 Claims, 5 Drawing Sheets

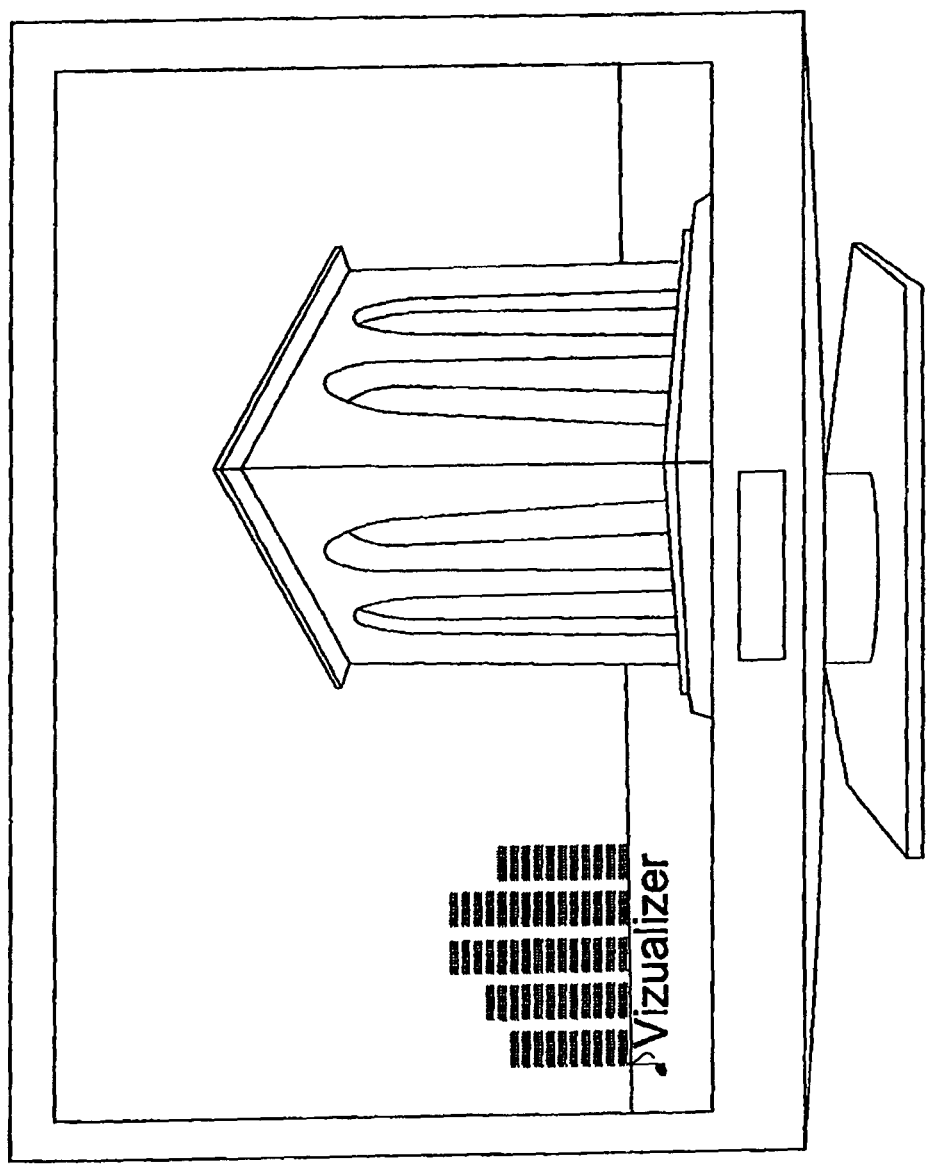

AUDIO-VIDEO REPRODUCTION APPARATUS

CROSS-REFERENCE TO RELATED APPLICATION

The present application claims priority from Malaysian Patent Application No. PI 20071365 filed in the Malaysian Patent Office on Aug. 16, 2007.

TECHNICAL FIELD

The present invention generally relates to audio-video (AV) reproduction apparatus, having a video output for driving a display means, and an audio output for driving one or more audio amplifying means. More specifically, the invention is concerned with visually presenting information about a sound signal being reproduced by the AV reproduction apparatus.

BACKGROUND ART

An audio spectrum analyzer (hereinafter referred to as "spectrum analyzer") is used for breaking down an audio signal into its individual audio frequency components. It is an important tool for audio recording engineers in analyzing and correcting the sound balance of an audio source. The result of the spectrum analyzer is normally represented by numerous rows of LEDs that represent the peak level input of a particular frequency band at a particular time. Each row of LEDs is driven by a circuit that has been tuned to pick up a particular frequency band in the audio spectrum, and each circuit lights up its respective LEDs according to the energy quantum of the signal received. As an audio signal is being fed into the spectrum analyzer, the rows of LEDs spike dynamically with every change in the audio signal.

Although the function of a spectrum analyzer is redundant in non-professional, consumer AV products like compact disc players, DVD players, TVs etc., the nature of representation of the spectrum analyzer adds a distinctive visual appeal to these products, as these products have conventionally contained mostly static, non-dynamic indicators.

Over the years, the spectrum analyzer has been incorporated into a multitude of AV products to increase their visual appeal to consumers. However, a spectrum analyzer circuit is very complex. So, the incorporation of the spectrum analyzer feature generally adds unnecessary cost, weight and dimension to a product. Therefore, from the production cost point of view, it is feasible only to incorporate spectrum analyzers into high-end, expensive electronics where the cost of incorporating the circuit is small compared to the cost of producing the electronics. Also, a stand-alone display for a spectrum analyzer consumes unnecessary space available for today's consumer AV products, which are getting more compact and smaller in size.

Product designers are constantly being demanded to introduce new attractive packaging and layouts to existing technologies to renew their marketability, without incurring unnecessary additional cost to the manufacturing processes.

U.S. Pat. No. 6,167,139 discloses an apparatus for controlling and outputting the volume and tone of a sound signal, which also contains an on-screen processor for outputting data superimposed on an image signal.

SUMMARY OF INVENTION

The principal aim of the invention is thus to implement the functionality of a spectrum analyzer into a consumer AV product at a minimum cost, preferably without having to incorporate a dedicated spectrum analyzer circuit into the product itself.

According to one aspect of the present invention, there is provided an audio-video (AV) reproduction apparatus having a video output for driving a display means, and an audio output for driving one or more audio amplifying means, the apparatus further comprising:

audio processing means for receiving a source audio signal, the audio processing means having frequency filtering means to selectively allow predefined frequency bands of the source audio signal to pass through said filtering means, control means for adapting the filtering characteristics of the frequency filtering means in a time-varying manner, so as to repeatedly cycle through said predefined frequency bands and acquire a respective sampled energy level of the filtered audio signal for all of the bands in each cycle; and video processing means for receiving the sampled energy levels of the filtered audio signal, the video processing means adapted to generate a dynamic visual representation, for display on the display means, of the frequency spectrum of the source audio signal based on variation in the acquired sampled energy levels.

The AV reproduction apparatus may be TV, VCR, DVD player, etc. In one embodiment, the device is portable or handheld. The AV reproduction apparatus need not have an embedded or built-in display.

In one embodiment, the frequency filtering means selectively emphasizes one of the predefined frequency bands of the source audio signal while attenuating the remaining predefined frequency bands of the source audio signal, in order to acquire each said sampled energy level.

In another embodiment of the present invention, the audio processing means maintains the sampled energy levels for all of the bands for the duration of one cycle. The displayed spectrum is then updated globally for all bands on each successive cycle.

According to one embodiment, the visual representation is superimposed over the video content of an AV signal reproduced by the apparatus.

According to another embodiment of the present invention, the visual representation is reproduced on an on-screen display.

Preferably, the visual representation comprises a set of bars corresponding to the predefined frequency bands. The number of bars displayed increases and decreases according to the strength of the input signal.

In an AV reproduction apparatus according to one embodiment of the present invention, the variation in the acquired sampled energy levels is represented by variations in the lengths of said bars. Each bar may be segmented to simulate a conventional multiple LED type of display.

In an AV reproduction apparatus according to another embodiment of the present invention, the number of predefined frequency bands is 5.

Preferably, the audio processing means and the video processing means are components of a common audio-video signal processing chip.

In a further aspect of the present invention, the apparatus includes the display means.

As will become apparent from the following detailed description, an audio-video processing chip having graphic equalizing capabilities represents a preferred application of the invention. However, there are numerous other devices wherein the invention will provide equal or similar effects, for example in one having a separate audio-only analog graphic equalizer. Also, various external video receivers can be programmed to accept and manipulate the output of the audio processing means to generate similar or identical dynamic visual representation for display on either integrated or separate displays.

Thus, the invention allows the realization of a spectrum analyzer without using a dedicated spectrum analyzing circuit.

BRIEF DESCRIPTION OF THE DRAWINGS

The invention is illustrated, although not limited, by the following description of preferred embodiments, that is given by way of example only with reference to the accompanying drawings, in which:

FIG. 4 illustrates a display device displaying the visual output of a spectrum analyzer over a video image according to the same embodiment.

DETAILED DESCRIPTION AND BEST MODE

In the present embodiment of the invention, a multi-function television processor chip, the UOCIII-TDA12010 (by Philips Semiconductors) is used in a television to handle and process both video and audio signals. Hereafter, such chip is referred to as a "multifunction chip" 100.

Figure 1:
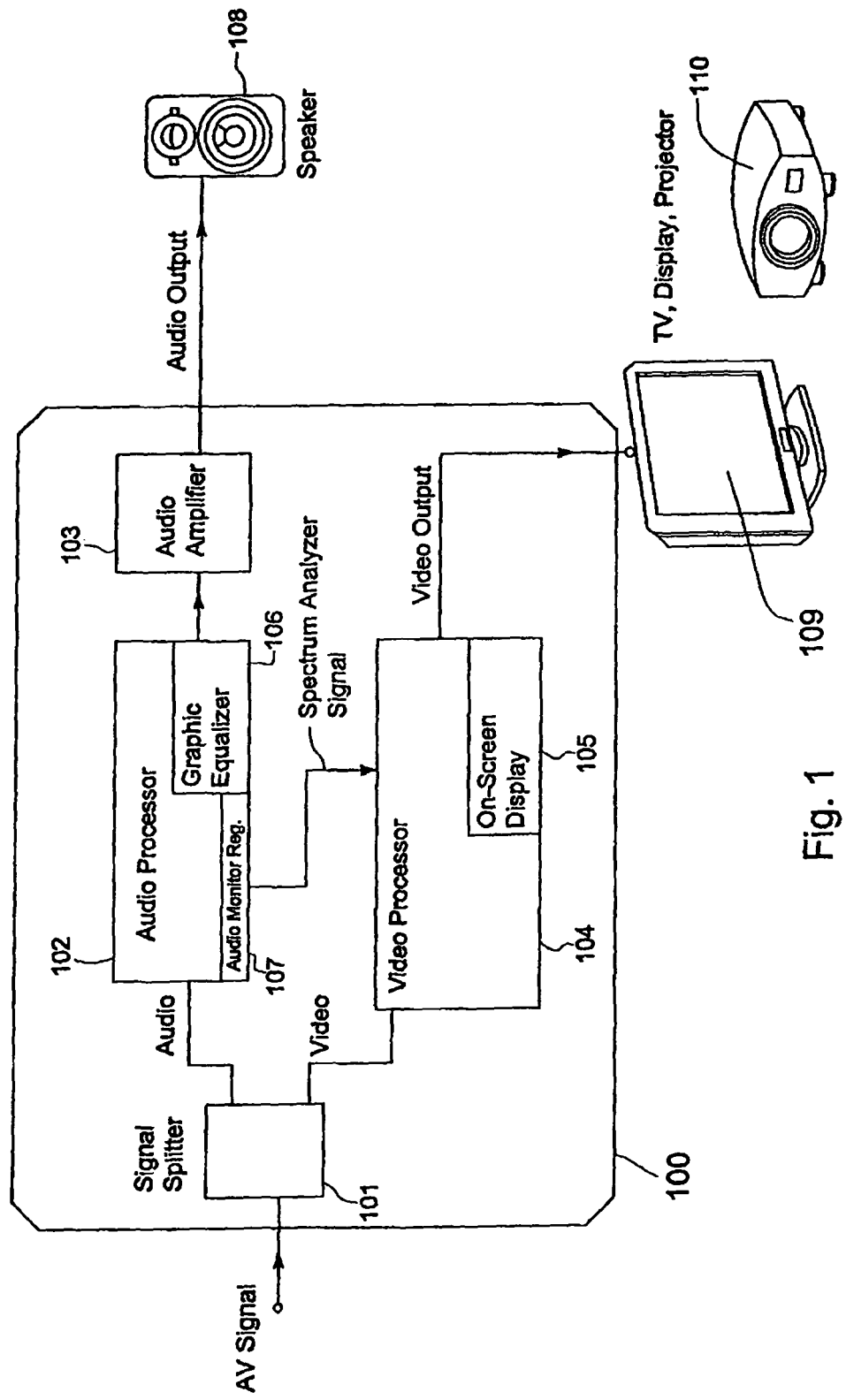
FIG. 1 is an illustration of an AV reproduction apparatus, that shows the internal architecture of the microprocessor used according to an embodiment employing the current invention to produce the spectrum analyzer over a video image according to the embodiment.

FIG. 1 shows a simplified schematic diagram of an AV reproduction apparatus that includes a multi-function chip 100. As the internal structure of the multi-function chip 100 is very complex, and the design of chip undergoes revision regularly for upgrades, certain components may be introduced or removed from the chip. A simplified diagram will allow an easier/more universal implementation of the invention into newer and perhaps older versions of the multi-function chip 100. In FIG. 1, the input signal is a mixed signal comprising both audio and video information. A signal splitter 101 is used to split the signal into its audio and video components. As the multi-function chip 100 is capable of handling many kinds of inputs, there will be many instances where the use of the signal splitter 101 will be unnecessary, as the video and audio signals will be input discretely into the chip 100.

Figure 2A:
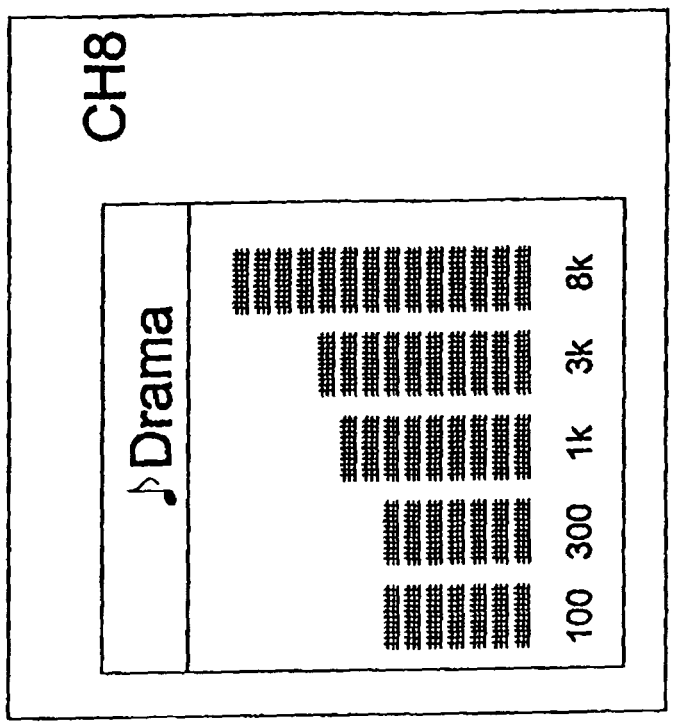
FIG. 2 in an illustration of the same embodiment showing two preset equalization patterns for fine-tuning the input signal.
Figure 2A:
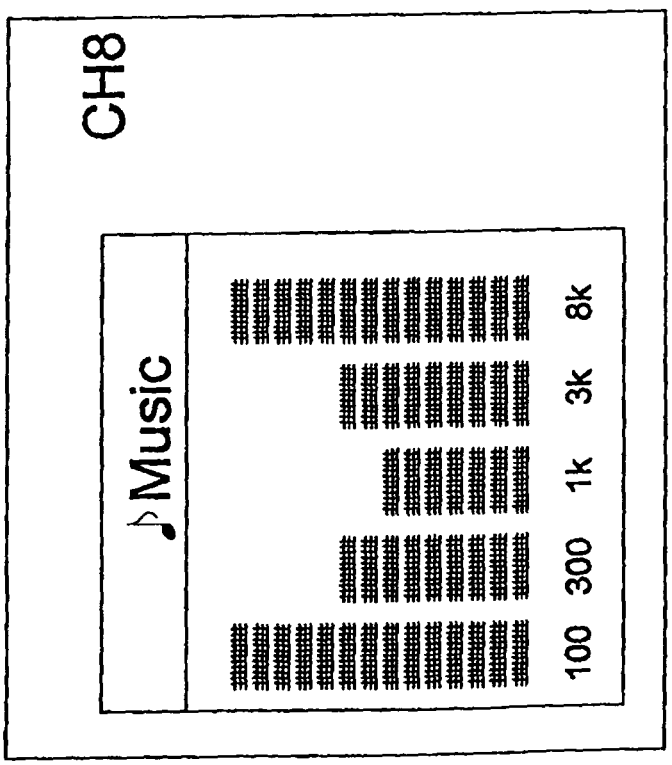

The audio processor 102 of the multi-function chip 100 has independent audio paths (not shown) for the main channel speakers and the center channel speaker. Each audio path comes with a programmable electronic 5-band equalizer 106 at center frequencies 100 Hz, 300 Hz, 1 kHz, 3 kHz and 8 kHz as illustrated in FIG. 2a. As the device in this particular embodiment does not employ any kind of multi-channel (Dolby Digital, DTS, LPCM, etc) decoding and playback, this leaves the center channel audio path unused when the device is in use.

Figure 2B:
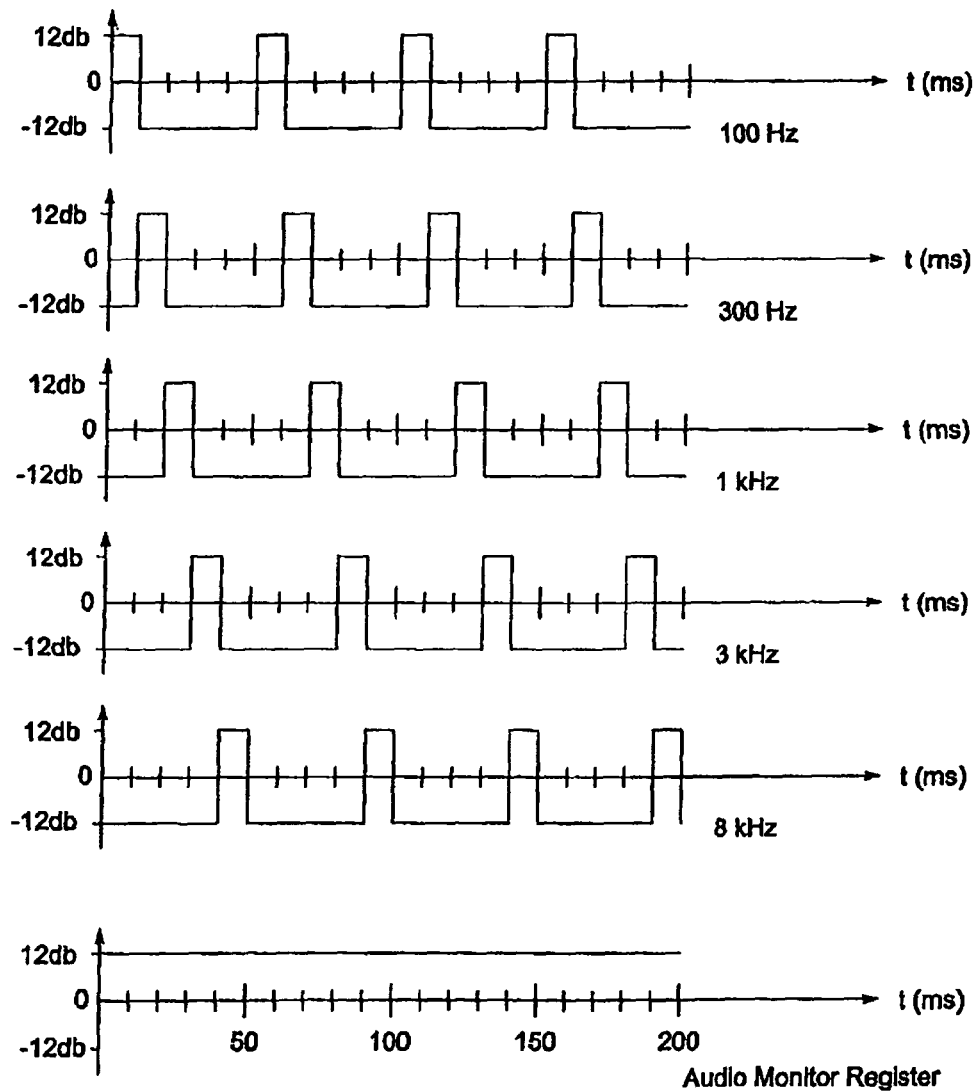

To perform spectrum analysis in accordance with this embodiment, the center to channel audio path is fed with the same sound source as that is being fed into the main audio channels. Referring to FIG. 2b, the electronic equalizer 106 for the center channel audio path is adjusted to boost the 100 Hz frequency band at 12 db while attenuating the other four frequency bands at −12 db for 10 ms. At the end of the 10 ms time frame, the same electronic equalizer 106 is adjusted boost the 300 Hz at 12 db while attenuating the remaining four frequency bands at −12 db for another 10 ms. At the end of the second 10 ms time frame, the electronic equalizer 106 is further adjusted to boost the 1 kHz band at 12 db while attenuating the remaining frequency bands at −12 db for another 10 ms interval. The process of boosting the next frequency band at 12 db and attenuating the remaining frequency bands at −12 db continues until the electronic equalizer 106 reaches its highest frequency band 8 kHz, where the boosting/attenuating process recycles from the 100 Hz band. This process recycles indefinitely while the device of the present embodiment is switched on. Thus, the audio processor 102 acts as a bandpass frequency filter wherein the frequency band that is passed changes in a time-varying manner.

While the above process is in motion, the audio monitor register 107 registers the collective energy quantum output level of the center channel audio path. However, with the above process in motion, the audio monitor register 107 is actually picking up a collection of audio peaks generated by the different frequency bands. Referring to the graphs in FIG. 2b, if the source audio is composed of the entire human audible sound frequencies, from 20 Hz to 20 kHz, at 0 db, all input signals around the 5 frequency components (100 Hz, 300 Hz, 1 kHz, 3 khz and 8 kHz) will be effected as indicated in the graphs. The audio monitor register 107 will however receive a constant flat output at 12 db, as the input is indeed a flat signal.

Figure 3:
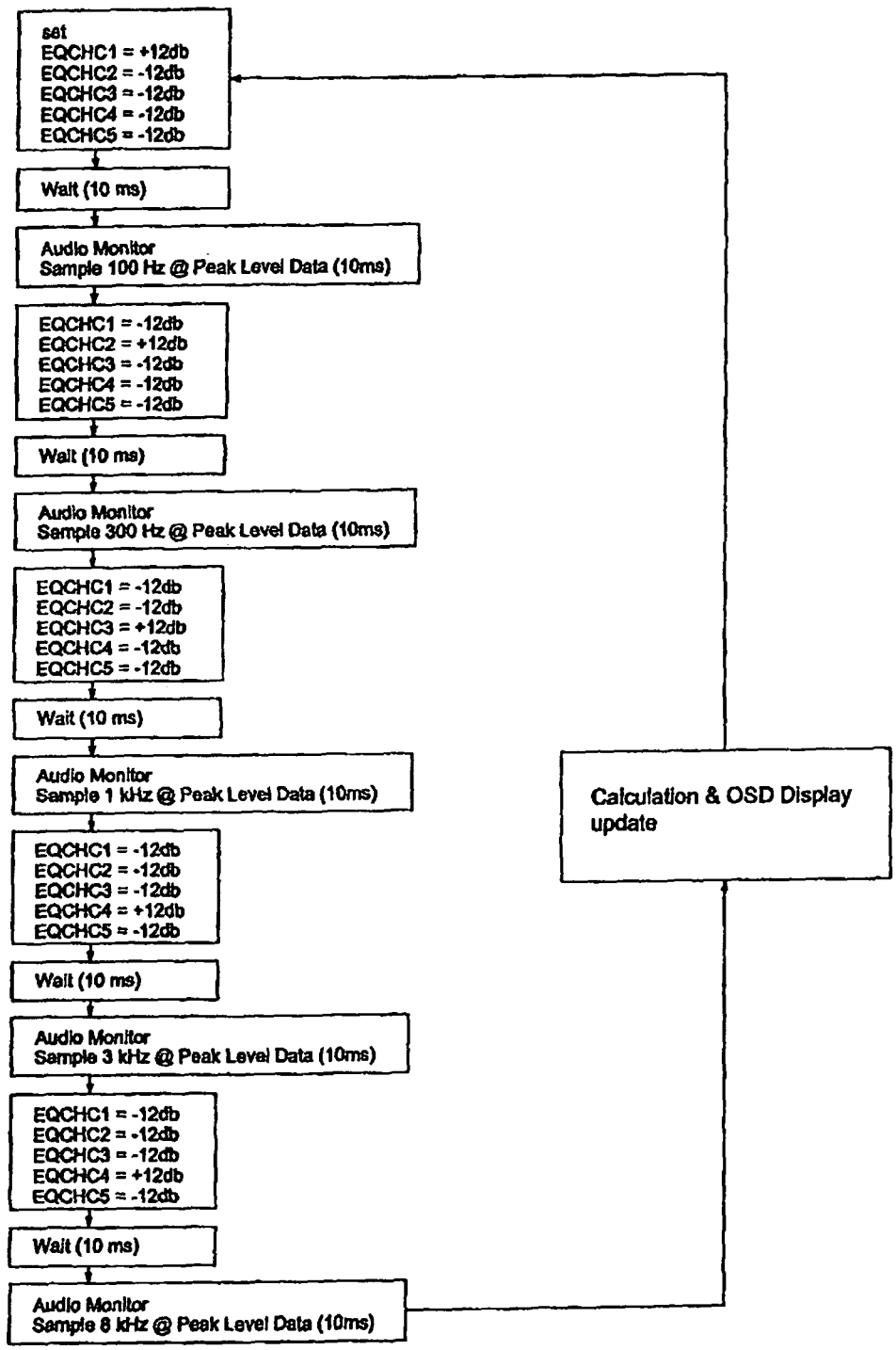
FIG. 3 illustrates the programming flowchart detailing the events within the microprocessor for the same embodiment when spectrum analysis is being performed.

The software flowchart in FIG. 3 shows the steps needed to instruct the multi-function chip to apply the above effects to an audio source and collect it at the audio monitor register 107. These steps will be embedded either via EEPROM programming or perhaps even direct factory fabrication along with any customized instruction sets used in the multi-function chip 100. The actual instruction codes used to instruct the multi function chip 100 will be according to the version/revision of the multi-function chip 100 and apparent to a person skilled in the art of programming the multi-function chip 100, so will therefore not be discussed in detail in this description. In the present embodiment, EQCHC1 through EQCHC5 are used to define each gain control for the 5 frequency bands for the electronic equalizer 106. From the top of the flow chart, it is shown that the electronic equalizer 106 was set to boost the first equalizer channel (100 Hz) of the input signal at 12 dB while attenuating the remaining channels of the input signal at −12 dB. EQCHC1 is assigned a "+12 dB" to raise the frequencies around 100 Hz at 12 dB while the remaining channels EQCHC2-5 are assigned a "−12 db" value to cut the frequencies around those channels by −12 dB. The audio monitor register 107 waits for 10 ms before picking up the adjusted input signal for 10 ms. Since the audio monitor register 107 has been set to only measure the output of the electronic equalizer 106 after 10 ms from the electronic equalizer adjustment, the values assigned to EQCHC1 through EQCHC5 are kept for at least 20 ms.

Going toward the bottom of the flowchart shown FIG. 3, it is shown that only after the entire set of audio peaks levels for each frequency band has been collected does the multifunction chip 100 begin to process the information to produce the spectrum analyzer output. From the flowchart in FIG. 3, the total time needed to complete one cycle is no less than 100 ms.

The entire process depicted in the flowchart in FIG. 3 repeats itself indefinitely, the process updates the content of the audio monitor register 107 at every cycle (100 ms), providing a seamless supply of spectrum analyzer output, effectively in the form of snapshot of the spectrum for each cycle.

The spectrum analyzer output signal in the present embodiment is then received and further processed by the built-in video processor 104 of the multi-function chip 100 to generate graphics that resembles a traditional spectrum analyzer, that is embedded within a video signal. This video signal, when displayed on a television display 109 or a projector display 110 capable of decoding the video/graphics output by the multi-function chip 100, appears for example at the bottom left corner of the display screen. An example of the generated graphics is shown in FIG. 5 on an LCD television.

The technique of superimposing of graphics over the broadcast picture is better known as On-Screen Display: where needed, the currently displayed image is sacrificed momentarily while an electronic menu or graphics either replaces portions of the screen or mixes with the content of the currently displayed image.

As seen in FIG. 4, the graphic that resembles a spectrum analyzer that appears to be embedded within the television screen comprises 5 dynamic LED-like segmented spiking bars. The length of each of these segmented bars is determined by the built-in video processor 104 of the multi-function chip 100 according to the signals received by audio monitor register 107. Therefore, the length of these segmented bars changes every time the data within audio monitor register is refreshed, which is every 100 ms.

It is understood that the invention may be embodied in numerous other ways without departing from the scope of the invention. Other kinds of AV or audio processing chips, having more or less than 5 predefined frequency bands to be displayed in the spectrum graphic can be used to achieve the effect of the invention as described above. Also, the above audio spectrum graphic can be set as a function of the AV apparatus, where the user can choose to turn it on or off as desired.

The invention claimed is:

1. An audio-video (AV) reproduction apparatus having a video output for driving a display means, and an audio output for driving one or more audio amplifying means, the apparatus further comprising:

audio processing means for receiving a source audio signal, the audio processing means having frequency filtering means to selectively allow predefined frequency bands of the source audio signal to pass through said filtering means, control means for adapting filtering characteristics of the frequency filtering means in a time-varying manner, so as to repeatedly cycle through said predefined frequency bands and acquire a respective sampled energy level of the filtered audio signal for all of the bands in each cycle; and video processing means for receiving the sampled energy levels of the filtered audio signal, the video processing means adapted to generate a dynamic visual representation, for display on the display means, of a frequency spectrum of the source audio signal based on variation in the acquired sampled energy levels, the audio processing means being operable to perform a process of boosting one of the predefined frequency bands of the source audio signal while attenuating all remaining predefined frequency bands of the source audio signal such that a level of only a single predefined frequency band is increased at a time when levels of all remaining predefined frequency bands are decreased and to repeat said process for each of the other predefined frequency bands, in order to acquire each said sampled energy level, in which the number of predefined frequency bands is five (5) or more, in which the audio processing means boosts each of the predefined frequency bands of the source audio signal by a positive value of a predetermined amount while attenuating the respective remaining four or more predefined frequency bands of the source audio signal by a negative value of the same predetermined amount, and in which after initiation of the process for a first one of the predefined frequency bands, the audio processing means completes the process of boosting and attenuating regarding the first one of the predefined frequency bands and performs all repeats of the process for each of the other predefined frequency bands in an automatic manner without input from a user during such time.

2. An AV reproduction apparatus according to claim 1, wherein the audio processing means maintains the sampled energy levels for all of the bands for the duration of one cycle.

3. An AV reproduction apparatus according to claim 1, wherein the visual representation is superimposed over the video content of an AV signal reproduced by the apparatus.

4. An AV reproduction apparatus according to claim 3, wherein the visual representation is reproduced on an on-screen display.

5. An AV reproduction apparatus according to claim 3 or claim 4, wherein said visual representation comprises a set of bars corresponding to the predefined frequency bands.

6. An AV reproduction apparatus according to claim 5, wherein said variation in the acquired sampled energy levels is represented by variations in the lengths of said bars.

7. An AV reproduction apparatus according to claim 1, wherein the audio processing means and the video processing means are components of an audio-video signal processing chip.

8. An AV reproduction apparatus according to claim 1, wherein the apparatus includes said display means.

9. An AV reproduction apparatus according to claim 1, wherein the predetermined amount is 12 db such that the positive value of the predetermined amount is 12 db and the negative value of the predetermined amount is −12 db.

10. An AV reproduction apparatus according to claim 1, in which one cycle of the process includes the process involving the first one of the predefined frequency bands and the repeats for each of the other predefined frequency bands for one occurrence each and in which processing for said one cycle is performed within a predetermined amount of time.

11. An AV reproduction apparatus according to claim 10, in which the predetermined amount of time is approximately 100 ms.

12. An AV reproduction apparatus according to claim 10, in which the predetermined amount of time is approximately 20 ms for each predefined frequency band.

13. An AV reproduction apparatus according to claim 1, wherein the audio processing means obtains the sampled energy levels for an entire set of all of the 5 or more predefined frequency bands for one cycle before the video processing means begins to generate the dynamic visual representation thereof.

* * * * *